United States Patent [19]

Lilja

[11] 4,046,610

[45] Sept. 6, 1977

[54] FLUID PRODUCT RESERVOIR AND METHOD

[76] Inventor: Duane F. Lilja, 2410 Central Ave. NE., Minneapolis, Minn. 55418

[21] Appl. No.: 638,658

[22] Filed: Dec. 8, 1975

Related U.S. Application Data

[60] Division of Ser. No. 512,523, Oct. 7, 1974, Pat. No. 3,934,746, which is a continuation-in-part of Ser. No. 413,768, Nov. 8, 1973, Pat. No. 3,841,555, which is a continuation-in-part of Ser. No. 280,476, Aug. 14, 1972, Pat. No. 3,780,943.

[51] Int. Cl.[2] .............................................. B32B 31/20

[52] U.S. Cl. ....................................... 156/73.1; 53/39; 156/73.5; 264/23

[58] Field of Search .................... 156/73.1, 73.2, 73.5; 264/23; 53/39; 215/247, 232

[56] References Cited

U.S. PATENT DOCUMENTS

| | | | |
|---|---|---|---|
| 3,602,257 | 8/1971 | Beryleyoung et al. | 156/73.1 |
| 3,728,184 | 4/1973 | Burke et al. | 156/73.1 |
| 3,806,386 | 4/1974 | Burke et al. | 156/73.1 |

*Primary Examiner*—Edward G. Whitby

*Attorney, Agent, or Firm*—Burd, Braddock & Bartz

[57] ABSTRACT

A fluid product reservoir to store a fluid product as for use in a pressurized spray system of the type concurrently discharging a gas and a spray product. The reservoir is leak-proof, economic to manufacture, and minimizes pressure fluctuation upon the dispensing of the fluid product. The reservoir provides a closed container having an open neck with interior walls defining an open throat. A plug is located in and closes the throat. An elastically penetrable insert is sealably located in a central opening of the plug. The method includes a method of storing a liquid product in a reservoir by providing a closed container having a neck portion defining an open throat. A plug is provided to close the open throat, and an elastically penetrable insert is provided in the plug. The method further includes a method of sealing the plug in the open throat.

11 Claims, 22 Drawing Figures

FLUID PRODUCT RESERVOIR AND METHOD

CROSS REFERENCE TO RELATED APPLICATION

This application is a division of U.S. application Ser. No. 512,523, filed Oct. 7, 1974, now U.S. Pat. No. 3,934,746 continuation-in-part application of U.S. application Ser. No. 413,768, filed Nov. 8, 1973, now U.S. Pat. No. 3,841,555, which is a continuation-in-part of application Ser. No. 280,476 filed Aug. 14, 1972, now U.S. Pat. No. 3,780,943.

BACKGROUND OF THE INVENTION

The invention relates to the field of liquid product reservoirs as usable, among other applications, in liquid spray systems and in particular those systems meant to provide a fine, particulate spray of liquid and a gas. Such a system finds application, for example, in beauty salons where hair setting liquids and hair holding liquids are in general use. These liquids are often packaged in aerosol cans. However, large scale use of aerosol cans is not economically feasible, and it is preferable to ship, store and use liquid products in non-aerosol containers for use in spray systems. One such spray system is that shown in U.S. Pat. No. 3,841,555, from which the present application derives. Such liquid product reservoirs must be durable yet economical to manufacture. Spray product reservoirs of the prior art systems employ dip tubes to draw spray product from the container. Dip tubes add to the expense of the container and are susceptible of malfunctioning and breakage. When the reservoir is to be used in inverted orientation, it must provide a leak-proof seal which will withstand pressure in the bottle.

SUMMARY OF THE INVENTION

The invention comprises a fluid product reservoir having general utility as for use such as in a pressurized spray system or as for dispensing medical solutions such as plasma and intravenous feeding solutions. The reservoir has a leak-proof seal and is thus usable in an inverted position. An open neck to the container of the reservoir defines a throat closed by a plug. A circumferential, inwardly directed ledge extending radially inward from the walls of the throat mates with and makes sealing contact with a ledge on the plug. A central insert in the plug is formed of an elastically penetrable material, as a latex rubber. The insert is adapted to be penetrated by a hollow needle for delivery of the fluid product within the container. Upon removal of the needle, the insert closes to seal the container. A needle for delivery of gas under pressure to the container may also penetrate the insert.

A method of storing a fluid product in a reservoir includes providing a closed container having a neck defining an open throat with an interior, outwardly facing ledge, and having a plug with outside walls closely conforming to the walls of the neck located in the throat; and further having an inwardly facing ledge on the plug mating with the ledge in the throat. The method further comprises locating an elastically penetrable insert in a central opening in the plug and fusing the same therein, filling the container with the liquid product, and fusing a portion of the plug to the ledge in the neck. A method of closing the plug in the throat includes inducing an ultrasonic vibration on both the plug and the walls of the throat to fuse the respective ledges of the plug and the throat together to form a seal.

An object of the invention is to provide a fluid product reservoir of general utility for storing a fluid product. A second object of the invention is to provide such a reservoir usable in a pressurized spray system of the type providing a concurrent discharge of spray product and gas to form a fine particulate spray. A further object of the invention is to provide such a reservoir usable in an inverted position and providing a fluid-tight seal. A yet further object of the invention is to provide a method for storing a fluid product in such a reservoir and a method of sealing the plug in the open throat of such a reservoir.

IN THE DRAWINGS

DESCRIPTION OF PREFERRED EMBODIMENTS:

Among the diverse applications for the fluid product reservoir of the present invention is that of a spray product reservoir in a spray apparatus as will be herein shown and described.

Figure 1:
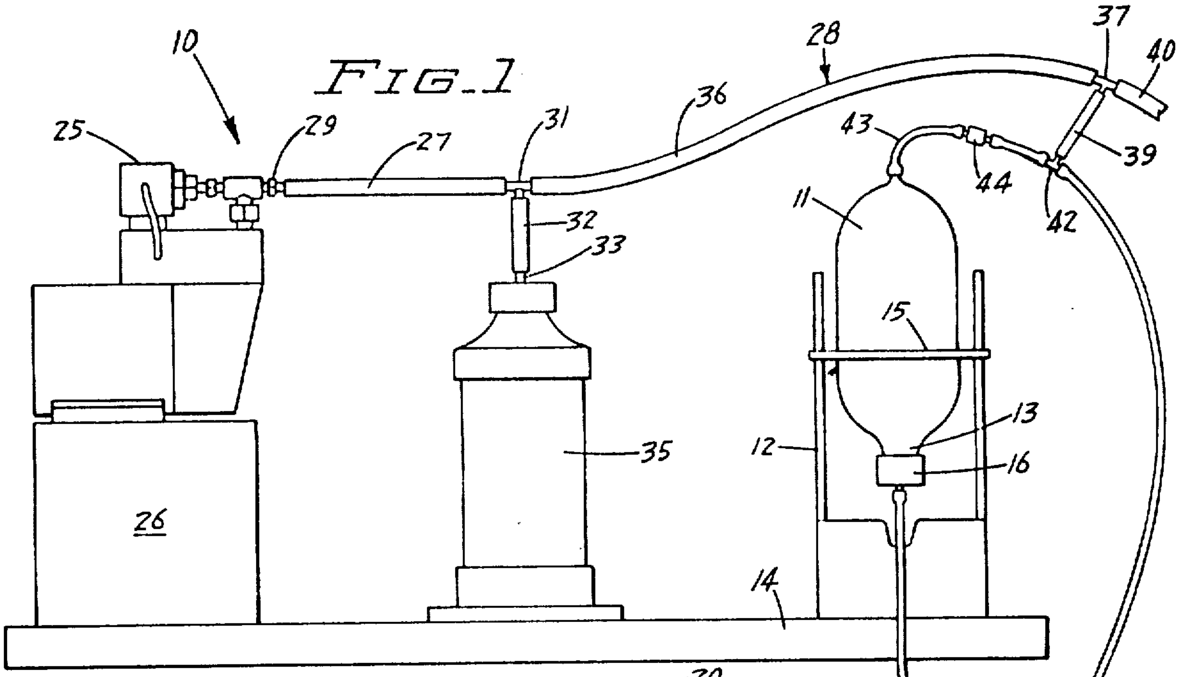
FIG. 1 is a schematic view of a spray apparatus of a type for using a fluid product reservoir of the present invention.
Figure 1:
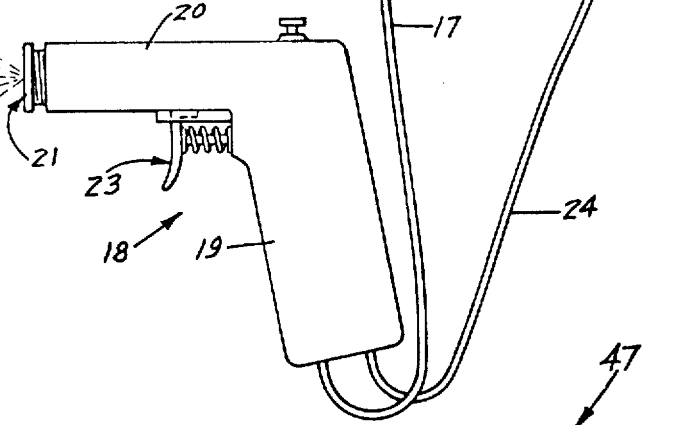

Referring to FIG. 1, there is shown schematically the various components of a spray apparatus, indicated generally at 10, in assembled relationship relative to one another. Spray apparatus 10 is of the type described and claimed in U.S. Pat. No. 3,841,555, from which the present application is derived. A product reservoir according to the present invention including a container 11 is supported by a stand or holder 12 on a surface 14, and is secured in place by appropriate strap 15. Container 11 stores or contains a liquid spray product, for example, a hair spray for use as a hair fixative in a beauty salon. Container 11 has a lower necked-in portion 13 closed and sealed by suitable closure means 16, as will be presently described. One end of a flexible, hollow, tubular spray product line 17 connects with an outlet of container 1 at closure means 16 as by engaging a hollow needle (not shown) inserted through closure means 16.

A spray applicator or spray gun 18 is adapted to concurrently discharge first and second fluids such as a spray product and air under pressure upon the surface to be sprayed. Spray gun 18 includes the usual base or handle 19 and a forwardly projecting barrel 20 terminating in an appropriate spray nozzle 21. A trigger 23 is movably mounted to the handle 19 of the gun. The product supply line 17 and the end of an applicator air supply line 24 extend through the bottom of handle 19 upwardly to barrel section 20.

Gas or air supply means includes an air compressor 25 shown supported on a suitable stand 26. A first section 27 of a main air line 28 extends from the air discharge 29 of compressor 25 to a first T-connector 31. The perpendicular leg of the T-connector 31 connects through a tubular branch 32 to an inlet 33 of an air pressure accumulator 35. The pressure accumulator 35 comprises a closed, empty container or vessel providing a sealed volume where air under pressure is accumulated for use when the air compressor 25 is shut off. The compressor 25 is of the variety equipped with a standard pressure switching mechanism whereby the compressor 25 is energized when the line pressure drops to a predetermined level or low limit, and shuts off when the line pressure has been raised to a second predetermined level or high limit. Compressor 25 provides pressurized air to applicator 18 and at the same time pressurizes accumulator 35.

A second section 36 of the main air supply line 28 extends from the first T-connector to a second T-connector 37. A connecting tube 39 extends from the perpendicular leg of the second T-connector 37 to provide air under pressure from main air supply line 28 to the container 11 and spray gun 18 of the spray apparatus. The main air supply line 28 continues from the second T-connector 37, as at 40, where it may be extended to additional spray systems connected in series, as, for example, in a beauty salon where there may be a plurality of stations, each having a separate spray product reservoir and spray applicator.

Connecting tube 39 extends from the second T-connector 37 to the perpendicular leg of a third T-connector 42. A reservoir air pressure supply branch 43 extends from one of the aligned legs of a third T-connector 42 to the product container 11. The end of supply branch 43 opposite the third T-connector 42 communicates with the interior of the container 11 as by engaging a tubular pin or needle (not shown) disposed generally in the upper portion of the container 11 and opening into the interior thereof. Connected to the opposite aligned leg of the third T-connector 42 is the applicator air supply line 24 which extends through the handle of the spray gun 18, as previously described.

Intermediately disposed in the reservoir pressure supply branch 43 is a one-way air valve 44 of the type to allow free air movement in one direction while restricting air movement in the opposite direction. As disposed in the reservoir air supply branch 43, valve 44 is orientated to allow flow of air under pressure into the container 11 from the main air line 28, but operable to prevent air from flowing back through the branch 43 from the container 11.

In the use of the spray apparatus of the invention, spray product is stored in the container 11, as, for example, a hair holding liquid. Compressor 25 pressurizes the spray system to the predetermined high limit. Accumulator 32 and the upper or empty portion of container 11 are likewise pressurized. Upon engagement of the trigger 23 of spray gun 18 by the operator, air and spray product are concurrently discharged from the nozzle. The air mixes with and atomizes the spray product to form a fine, particulate, uniform spray. Air in the container 11 does not back up through the branch 43, whereby an erratic pressure fluctuation is not experienced by the spray product in the container. The spray is therefore fine and uniform at low pressure.

Figure 3:
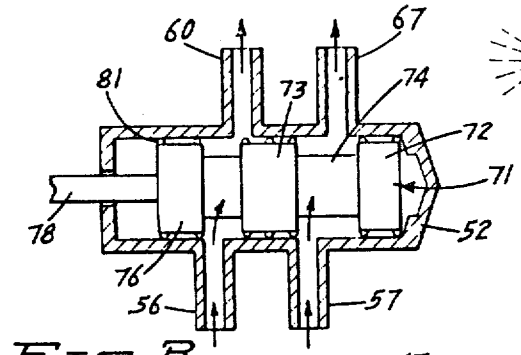
FIG. 3 is a schematic view of the valving means of the spray applicator of FIG. 2 in a fully open position.
Figure 2:
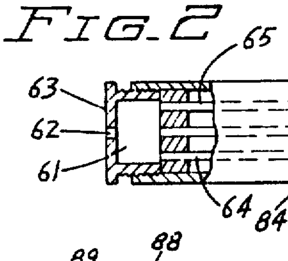
FIG. 2 is a side elevational view of a spray applicator usable in the spray apparatus of FIG. 1.
Figure 2:
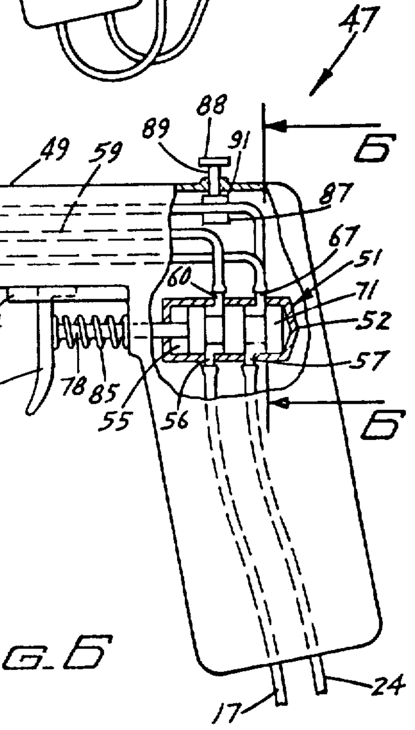
Figure 6:
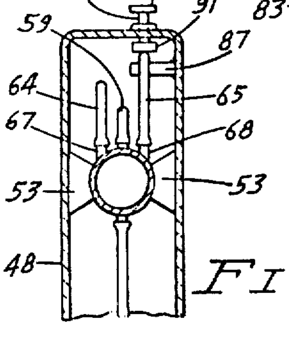
FIG. 6 is a sectional view taken along the line 6—6 of FIG. 2.

A specific spray applicator for use in conjunction with the spray apparatus 10 of FIG. 1 is shown in FIG. 2 and is fashioned for convenience as a spray gun 47 having an outer housing with a handle portion 48 and a barrel portion 49. Spray gun 47 includes sequential fluid discharge valving means 51 for staging of the air spray and the liquid spray at initiation and termination of spraying. A valve casing or housing 52 of valving means 51 is cylindrical and is centrally located in handle 48 and is secured in position by suitable struts 53, as shown in FIG. 3, extending from the interior walls of handle 48. Valve casing 52 defines an interior valve chamber 55 having separate inlet means and outlet means for a first and second fluid or, specifically, for air and a liquid spray product. Spray product line 17, entering the bottom of handle 48, engages a fluid or liquid inlet port 56 on casing 52 opening into chamber 55, as by snugly engaging an open nipple associated with a port 56. Likewise, air line 24 enters the bottom of handle 48 and engages an open nipple associated with fluid or air inlet port 57 spaced from liquid inlet port 56. A liquid line 59 leads from a liquid spray product outlet port 60 from valve chamber 55 to a mixing chamber 61 afforded by a suitable spray nozzle 63 having spray orifice 62 and threaded into the end of barrel portion 49 of applicator 47 to establish fluid communication between the fluid outlet means and spray nozzle 63. A pair of flexible, tubular air lines 64, 65 extend from a pair of open nipples integral with a pair of circumferentially aligned air outlet ports 67, 68 in communication with chamber 55 of valve casing 52. Air lines 64, 65 extend to and open into mixing chamber 61 to establish fluid communication between the air outlet means and the spray nozzle. Movably located in valving chamber 55 is a valving element 71 having first and second fluid passages or conduits for establishing communication between the air inlet and outlet ports and the liquid spray product inlet and outlet ports, respectively. Valving element 71 located in valve chamber 55 is sequentially movable between a first position in blocking relationship to the spray product inlet and outlets, and in blocking relationship to the air inlet and outlets shown in FIG. 5; a second position in blocking relationship to the spray product inlet and outlet, but with the first fluid conduit allowing fluid communication between the air inlet and air outlets, shown in FIG. 4; and a third position with the second fluid conduit allowing fluid communication between the spray product inlet and outlet and with the first fluid conduit allowing fluid communication between the air inlet and outlets, shown in FIG. 3.

Figure 4:
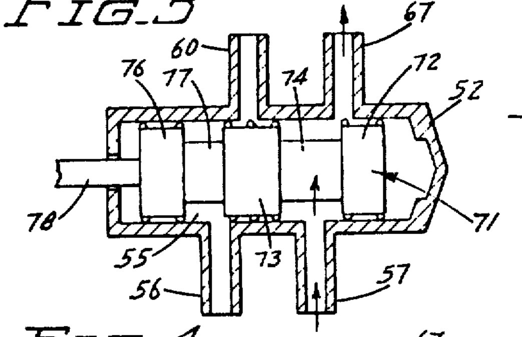
FIG. 4 is a schematic view of the valving means of FIG. 3 in an intermediate position.
Figure 5:
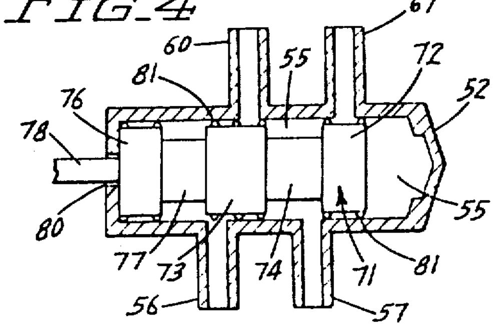
FIG. 5 is a schematic view of the valving means of FIG. 3 in a fully closed position.

Referring to FIGS. 3 through 5, valving element 71 is comprised as a plunger having a plurality of spaced apart, aligned, cylindrical heads 72, 73 and 76 having outer walls with portions in sealing relationship to the interior walls of the valve chamber 55. The heads are relatively spaced apart to provide passages to accomplish, in conjunction with the spacing of the various ports, the aforementioned staging or sequential valving action. A first head 72 is located at the interior end of valving plunger 71 relative to chamber 55, and is movable into and out of blocking relationship relative to the air inlet port 57 and air outlet ports 67, 68. A second head 73 is connected in aligned relationship to the first head 72 by a first neck 74, and is movable into and out of blocking relationship between the spray product inlet port 56 and the spray product outlet port 60. A neck 74 connected to heads 72 and 73 has a reduced diameter and outer walls spaced from the interior walls of the chamber 55, thus providing a first fluid conduit or passage through the chamber 55. A third head 76 is spaced from the second head 73 and connected to it by a second neck 77. Second neck 77 is likewise reduced in diameter and provides a second fluid conduit or passage through the chamber 55. A valve shaft 78 extends from the third head 76 outward of chamber 55 through a suitable aperture 80 wherein there is provided usual and preferred sealing means to prevent leakage. The various heads 72, 73, 76 have outwardly projected circumferential ridges 81 which contact the interior walls of the chamber 55 and provide the necessary sealing relationship.

Plunger 71 is movable between three operative positions in the initiation and termination of spraying. In the initiation of spraying, plunger 71 is linearly movable from a first or closed position of FIG. 5, wherein both air and fluid passages are blocked; to a second position of FIG. 4, wherein fluid passage is blocked but air passes through inlet passage 57, around the first neck 74, and through air outlet ports 67, 68, thereby commencing air flow; and to a third position of FIG. 3 wherein fluid flow is initiated through fluid inlet port 56, around second neck 77 and out fluid outlet port 60 while air flow continues as previously described. The commencement of air and fluid flow is thus staged. Termination of spraying is also staged, first fluid then air, by the reverse of the above procedure. The staging is accomplished by the relative sizing and spacing of the first and second heads 72, 73 as well as the spacing of the various ports.

Referring again to FIG. 2, linear movement of plunger 71 in valving chamber 55 is controlled by linear movement of plunger shaft 78 linearly extending from the third head 76 and second neck 77. Plunger shaft 78 extends outward from the valve chamber 55 and outward of the gun handle 48 and is attached at one end to a trigger 83. The upper end of trigger 83 is guided for linear movement in a suitable channel 84. A helical compression spring 35 surrounds the outboard portion of shaft 78 between trigger 83 and gun handle 48 to bias valve plunger 71 in the outermost or closed position. Digital pressure on trigger 83 is operative to actuate valving means 51 to provide the previously described staged spray of spray product and air.

The spray applicator 47 allows the spray operator to alternate between a fine and a more coarse spray. Air outlet means on the valve casing 52, as previously noted, includes a pair of outlet ports 67, 68 which are joined respectively to a pair of air lines 64, 65, of which at least one is comprised of a flexible tubing. The flexible tubular air line 65 extends upward from valve casing 52 and then extends forwardly to the mixing chamber 61. A portion of the air line 65 passes over a ledge 87 extending inward from a vertical wall of applicator 47 near the top of barrel portion 49. A button 88 located exteriorly of barrel 49 has a shaft 89 passing through an aperture provided in barrel 49, and terminates in a plate 91. A portion of the air line 65 is sandwiched between the plate 91 and the ledge 87. Application of digital pressure downward on the button 88 results in the pinching off of the air line 65 cutting the flow of air to the mixing chamber 61 by approximately one-half. The resultant spray is more coarse.

In the use of the applicator 47, the operator simply engages the trigger 83. As the shaft 78 moves the plunger 71 interiorly of the valve chamber 55, the air and liquid product sprays are automatically staged. Likewise, upon termination of spraying, simply by release of the trigger 83 the termination of the air and liquid sprays is staged. The spring 85 returns the plunger 71 to the closed position. Pneumatic pressure developed in the interior end of the chamber 55 upon inward movement of plunger 71 also biases the plunger toward a closed position.

Shown and illustrated in FIGS. 7 through 10 is a liquid product reservoir or container assembly, and a container closure assembly according to a first embodiment of the present invention, indicated generally at 92. A generally cylindrical spray product container 93 contains the spray product and is mounted in a holder 94 in an inverted position with the dispensing end downwardly directed. Container 93 is preferably plastic, such as polypropylene or polyethylene, formed by a conventional forming process. Container 93 has a rounded shoulder 96 at the dispensing end thereof, in the orientation shown in FIG. 7, which rests on a radially inward projected shelf 95 integral with holder 94. A plurality of vertical guides 97, shown in FIG. 8, correctly position the container 93. At the lower-most portion of container 93 is an open neck member 98 defining an open throat closed by a plug member 99. An open central portion of the plug 99 is closed by an insert 101 formed of an elastically penetrable material such as latex rubber or a suitable plastic. A pointed hollow needle 102 is securely, vertically positioned by suitable brace means 103 at the bottom of holder 94. The upper pointed portion of the needle 102 penetrates the insert 101 and communicates with the interior of the container 93. The lower end of the needle 102 is engaged by one end of the spray product delivery line 17A as at 105. Spray product delivery line 17A is trained upwardly along holder 94, emerging therefrom to extend to the spray applicator, as previously described.

An arm 106 is pivotally assembled to the top of holder 94 at the back thereof as at 107. Interiorly mounted in arm 106 and extending downward therefrom is a hollow, pointed, slightly curved needle 109. The pointed end of needle 109 penetrates the upper portion of container 93 and communicates with the interior thereof. The opposite end of needle 109 is connected to a one-way air valve 44A of the type previously described. The one-way valve 44A is connected to one leg of a T-connector 42A mounted interiorly of the arm 106. The other two legs of the T-connector 42A are connected respectively to a branch 39A leading from a main air supply line, and an air supply line 24A leading to the applicator, as previously described. It may be seen that the air delivery line 24A and spray product delivery line 17A correspond to the air supply line 24 and product delivery line 17 of FIG. 1, while the branch line 39A corresponds to the branch 39 of FIG. 1.

In use, a full liquid product reservoir 92 of spray product is placed in the holder with the arm 106 pivoted out of the way. The guides 97 properly position the container in the holder with the insert 101 of plug 99 in neck 98 positioned over the liquid product needle. A gentle push downward on the container 93 causes the fluid needle 102 to pierce the insert 101 which seals around the needle 102 to prevent leakage, thereby establishing the liquid communication between the spray product in container 93 and the spray applicator. Arm 106 is pivoted downward to a position whereby the air needle 109 punctures the container 93 and enters it. The air needle 109 is slightly curved so as not to rip or tear the surface of container 93, but enter in a smooth continuous motion. With the air needle 109 seated in the container 93, the air pressure connection is established between the main air line and the interior of the container 93. After the container 93 is emptied, it is simply removed from the holder 94 and discarded. Upon removal of liquid product needle 102 from insert 101, insert 101 reseals to prevent loss of liquid in the event that container 93 is not yet empty.

Figure 10:
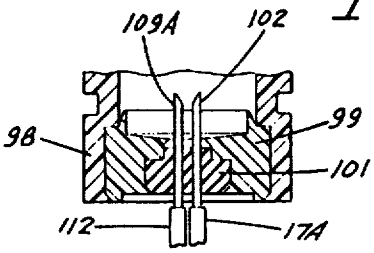
FIG. 10 is an enlarged sectional view of a portion of the fluid product reservoir of FIG. 7 illustrating a modification thereof.

As shown in FIG. 10, the air needle could optionally be situated adjacent the liquid product needle 102. An air needle 109A is suitably secured in brace 103 adjacent liquid needle 102 and penetrates insert 101. A suitable connecting tube 112 connects air neeedle 109A to the air pressure supply branch. Air under pressure is delivered to the container 93 through air needle 109A as spray product is delivered through the liquid needle 102 to the applicator. The one-way air valve 44A prevents the backing up of the sproay product into the main air line 24A or air delivery line 39A.

Figure 9:
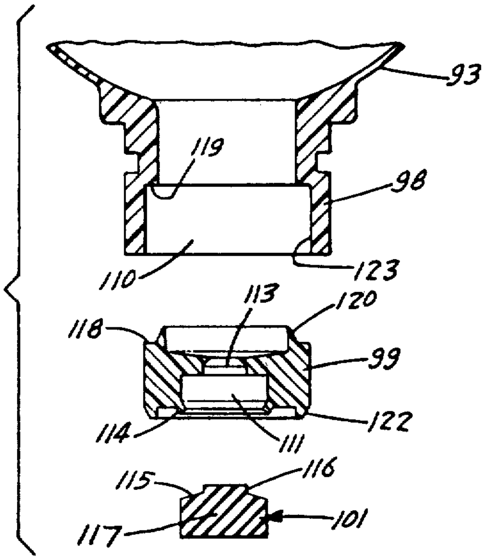
FIG. 9 is an exploded sectional view of the closure portion of the fluid product reservoir of FIG. 7.

The closure assembly of liquid product reservoir 92 is shown in greater detail in FIG. 9. Container 93 terminates in neck member 98 having an open throat 110 adapted to snugly receive plug member 99. Plug 99 is generally cylindrical having outside walls to closely conform to the interior walls of neck 98, and has a central cylindrical opening 111 having a reduced, tapered opening 113 facing the interior of container 93. Peripherally surrounding the opposite end of opening 111 on plug 99 is, in the unassembled form of FIG. 9, an outwardly directed, upstanding annular ridge 114.

Insert 101 has a generally cylindrical body 117 adapted to snugly fit in the central opening 111 of plug 99. A conical shoulder 115 extends from body 117 toward the interior of container 93, terminating in a reduced cylindrical section 116.

Figure 7:
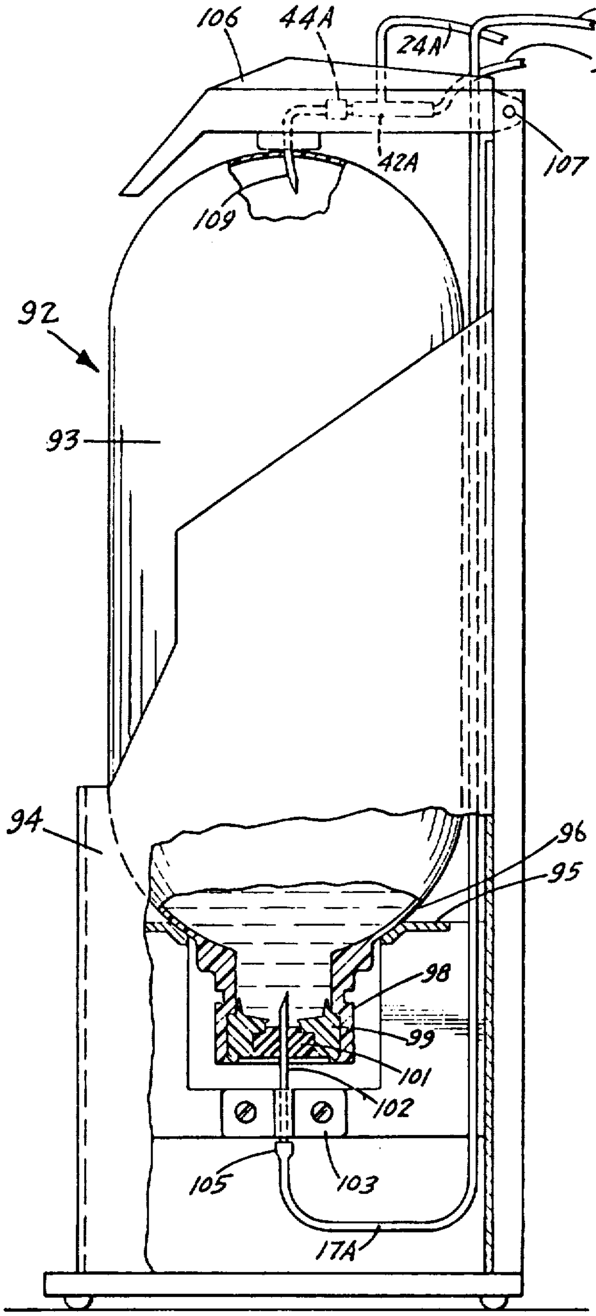
FIG. 7 is a side elevational view of a fluid product reservoir according to a first embodiment of the present invention located in a holder with portions sectioned for illustration.
Figure 8:
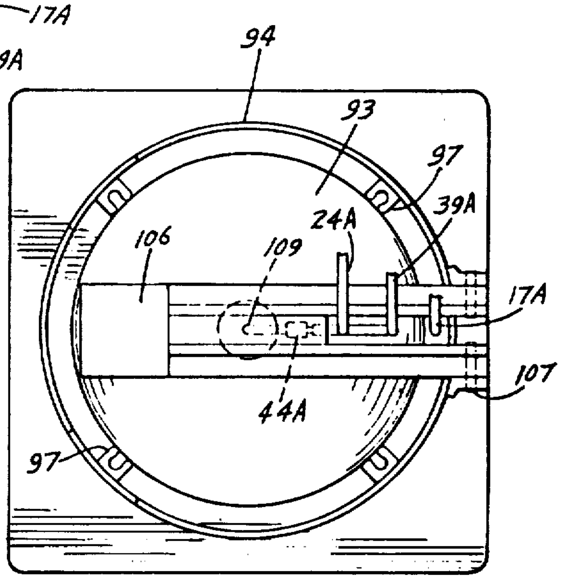
FIG. 8 is a top plan view of the reservoir and holder of FIG. 7.

In assembly, insert 101 is first positioned in the central opening 111 of plug 99 whereby the conical shoulder 115 and reduced cylindrical portion 116 of insert 101 make sealing contact with the interior walls defining reduced tapered opening 113 in plug 99. Ridge 114 is fused by heat or other suitable means over the outer end of insert 101, as seen in FIG. 7, whereby the insert is tightly sealed in plug 99.

The container 93 having been filled with the proper spray product, plug 99 is positioned in throat 110 of neck 98. An exterior outer peripheral ledge 118 on plug 99 abuts a mating, interior annular ledge 119 at the interior end of throat 110. A tapered, interiorly directed lip 120 adjacent ledge 118 on plug 99 is forced radially inward by the corner of ledge 119 in throat 110 to effect a seal. An annular ridge 12 located at the exterior end of plug 99 and coextensive with the perimeter thereof, is fused to the end portion 123 of the interior walls of neck 98 as by spin welding or such other method to form a leak-proof seal between the plug 99 and the neck 98.

The assembly of the insert 101, plug 99 and container 93 is such that the container 93 is not reusable upon depletion of the spray product. The mixing of volatile or toxic substances and residues is avoided.

Figure 11:
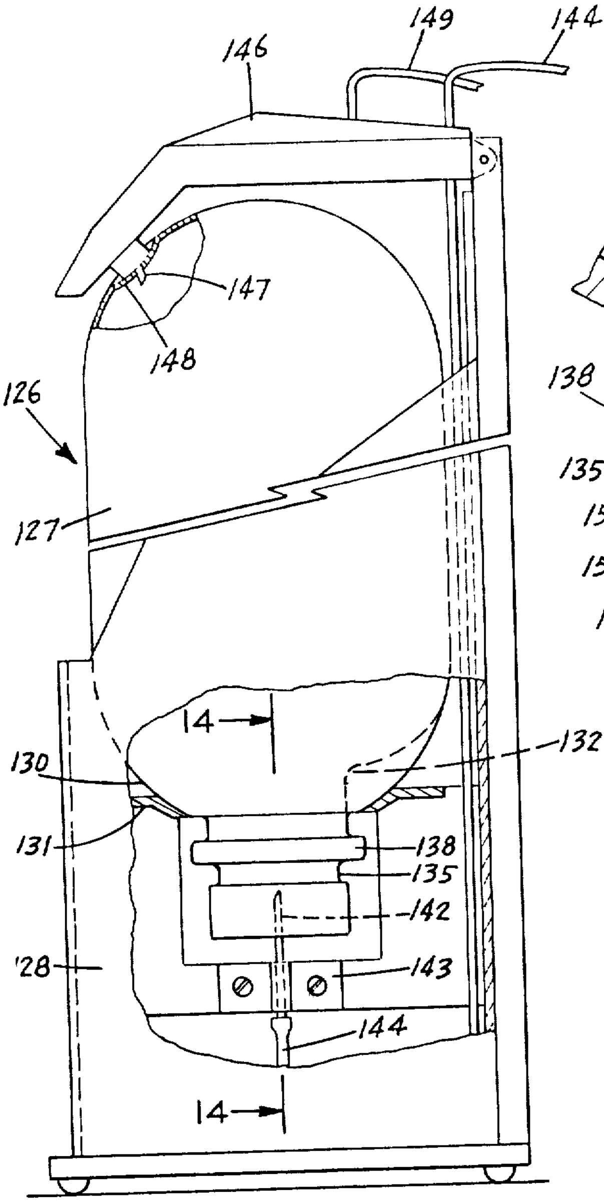
FIG. 11 is a side elevational view of a fluid product reservoir according to a second embodiment of the invention located in a holder with portions broken away for purposes of illustration.
Figure 12:
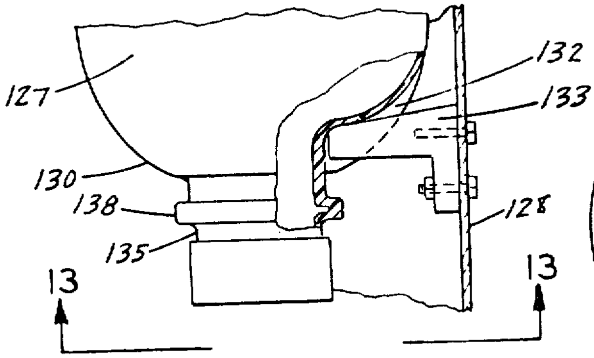
FIG. 12 is a detail view of a portion of the reservoir of FIG. 11 with portions broken away for purposes of illustration.
Figure 13:
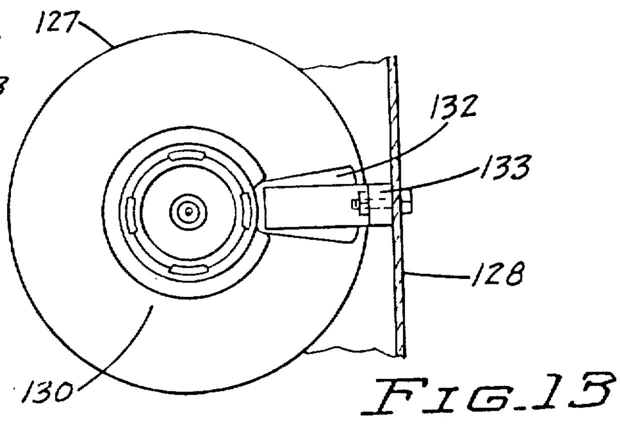
FIG. 13 is an end view of the reservoir of FIG. 12 taken along the line 13—13 thereof.

Shown and illustrated in FIGS. 11 through 16 is a product reservoir and closure assembly according to a second embodiment of the invention, indicated generally at 126. A generally cylindrical spray product container 127, as shown in FIG. 11, is mounted in a holder 128 having the dispensing end orientated downward. Container 127 has a rounded shoulder 130 which rests on a radially inward projected shelf 131 integral with holder 128. Shoulder 130 of container 127 is interrupted by a notch or groove 132, as shown in FIGS. 12 and 13. An arm 133 is assembled to the holder 128 by suitable screws or the like and extends inward toward the container 127. The groove 132 rests on the arm 133 to insure that the container 127 is correctly positioned on the holder 128 about its longitudinal axis. At the dispensing end of container 127 is a neck member 135 defining an open throat 136 closed by a plug member 137. An annular rib 138 surrounds the neck 135 at an intermediate position thereon. An open central portion 140 of plug 137 is closed by an insert 141 formed of an elastically penetrable material such as latex rubber or a suitable plastic.

A pointed hollow needle 142 is securely, vertically positioned by a suitable brace means 143 at the bottom of holder 128. The upper pointed portion of the needle 142 penetrates the insert 141 and communicates with the interior of the container 127. The lower end of the needle 142 is engaged by one end of a spray product delivery line 144 which is trained upwardly along the holder 128, emerging therefrom to extend to the spray applicator, as previously described.

An arm 146 is pivotally assembled at one end to the top of holder 128 for pivotal movement of the free end proximate to and away from the closed end of container 127. A hollow, pointed and slightly curved needle 147 is mounted in the free end of arm 146 adapted to penetrate container 127, as shown, upon pivotal movement of the arm 146 toward the container. Container 127 has a dished-in portion or dimple 148 to receive the needle 147. Dimple 148 is properly aligned in the rotational path of travel of needle 147 when the groove 132 at the opposite end of container 127 is properly situated on the arm 132. Dimple 148 facilitates penetration of the needle 147 in the container 127 by restricting sliding of the needle 147 over the surface of the container. An air line 149 provides air under pressure to the container 127 through the needle 147, as previously described.

Figure 14:
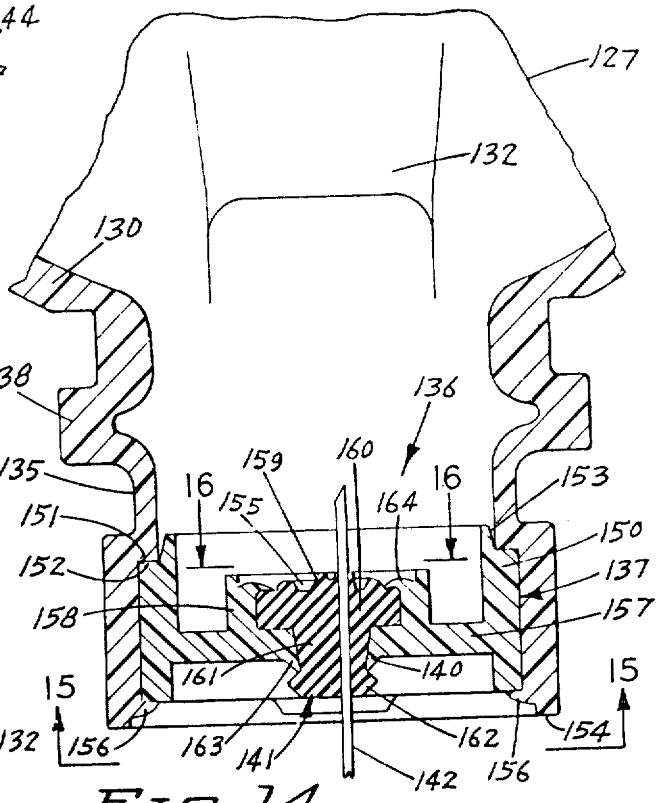
FIG. 14 is an enlarged sectional view of the reservoir of FIG. 11 taken along the line 14—14 thereof.
Figure 15:
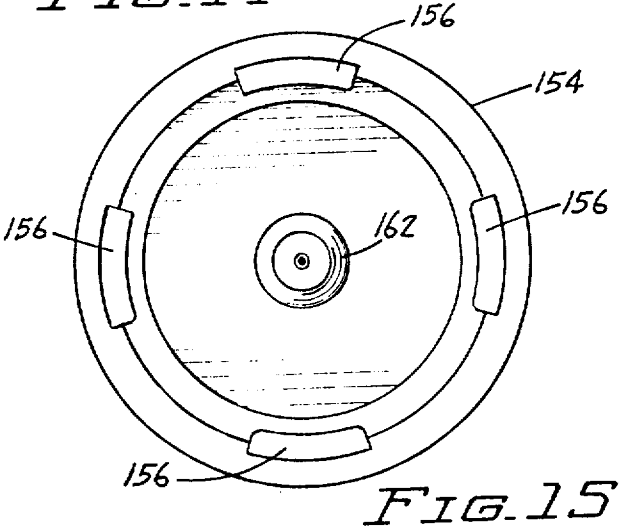
FIG. 15 is an end view of the reservoir of FIG. 14 taken along the line 15—15 thereof.
Figure 16:
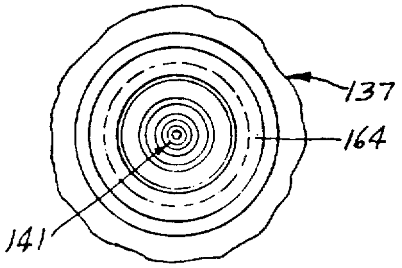
FIG. 16 is an end view of a portion of the plug of the reservoir of FIG. 14 taken along the line 16—16 thereof.

The closure assembly of reservoir 126 is shown in detail in FIGS. 14 through 16. A circumferential, outwardly facing ledge portion 151 is located in the throat 126. Plug 137 is generally cylindrical, having an annular side wall 150 to closely conform to the interior walls of neck 135 outward of ledge 151. The inner end of plug 137 is provided with a ledge portion 152 in mating contact with and bonded to the ledge 151 of neck 135. The ledges 151 and 152 may be sealably joined or bonded in conventional fashion but preferably are sealably joined or welded according to the method of the present invention, as will be more fully explained. A tapered, inwardly directed lip 153 extends from the inner edge of ledge 152 on plug 137 toward the interior of container 127. Plug 137 rests in throat 136 with the outer edge of side wall 150 recessed relative to the outer end 154 of the neck 135. To further secure plug 137 in throat 136, as shown in FIGS. 14 and 15, discrete portions of the end 154 of the neck 135 are turned over the outer end of side wall 150 of plug 137 to form a plurality of tabs 156 holding the plug 137 in place.

Plug 137 has a horizontal bulkhead or end wall 157 extending diametrically between the inner surfaces of side wall 150 and having the central opening 140 accommodating the elastically penetrable insert 141. On the interior side of wall 157 is an annular sleeve 158 surrounding the opening 140 and providing a chamber for accommodation of the base 160 of insert 141. Base 160 is snugly accommodated in the chamber of sleeve 158 and bears against the peripheral portion of wall 157 surrounding the opening 140. Base 160 has a central depression 155 facing the interior of container 127 with an inwardly directed, conical shaped nipple 159. Nipple 159 has an indented tip and facilitates closure of insert 141 upon removal of one or more needles therefrom. A neck 161 extends from base 160 through the opening 140 and terminates at an enlarged head 162 on the opposite or exterior side of wall 157. A tapered rim 163 surrounds the outer endge of opening 140 and bears against the neck 161 of insert 141. As shown in FIGS. 14 and 16, insert 141 is held in position in plug 137 by a flange 164. Flange 164 is constituted as a arcuate segment extending radially inward from the inner edge of sleeve 158 over the top of base 160 of insert 141.

The use of container assembly 126 of the second embodiment of the present invention is the same as that described in the use of the container assembly 92 of the first embodiment. The container 127 is inserted in the holder 128, the needle 144 passing through the elastically penetrable insert 141 and establishing fluid communication with the interior of the container. The arm 146 of holder 128 is rotated to a position where the needle 147 supplying air under pressure punctures the container 127 at the dimple 148. The dimple 148 is correctly aligned to receive the needle 147 by proper positioning of the container such that the groove 132 engages the arm 133 in the lower portion of the holder 128. Container 127 eliminates the use of the conventional overcap to close the neck and provides a well sealed container which is usable in the inverted position, as shown.

Figure 17:
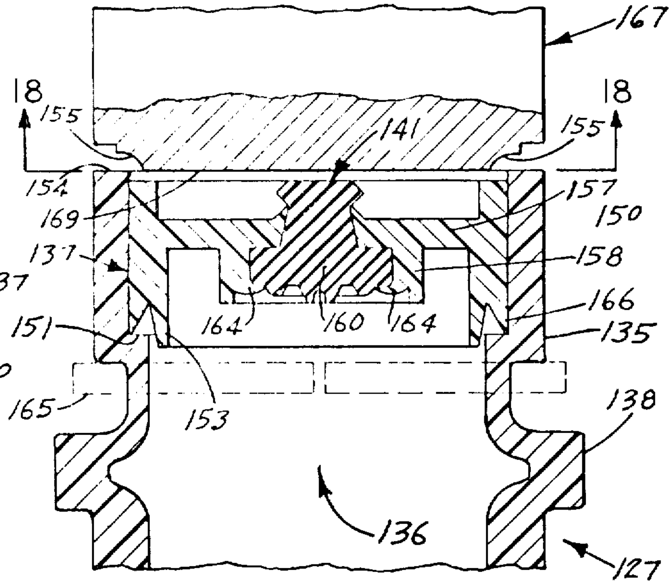
FIG. 17 is a sectional view of a portion of a reservoir illustrating a method of closure thereof according to the present invention.
Figure 19:
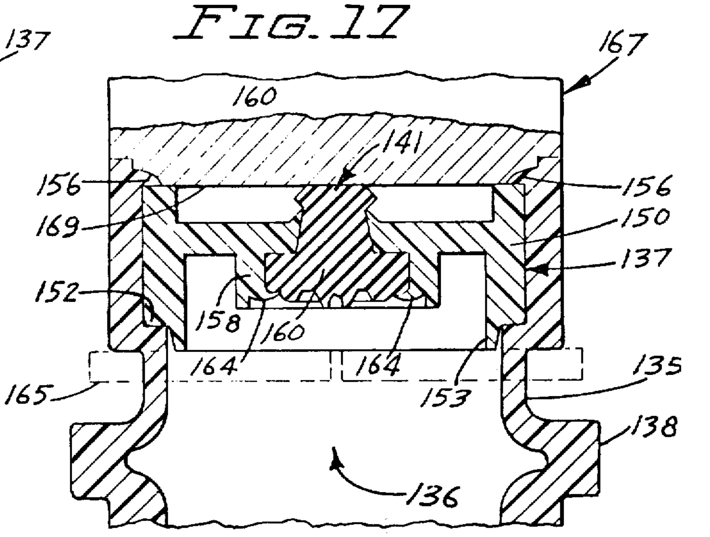
FIG. 19 is a sectional view of a portion of a reservoir further illustrating the method of closure thereof.
Figure 18:
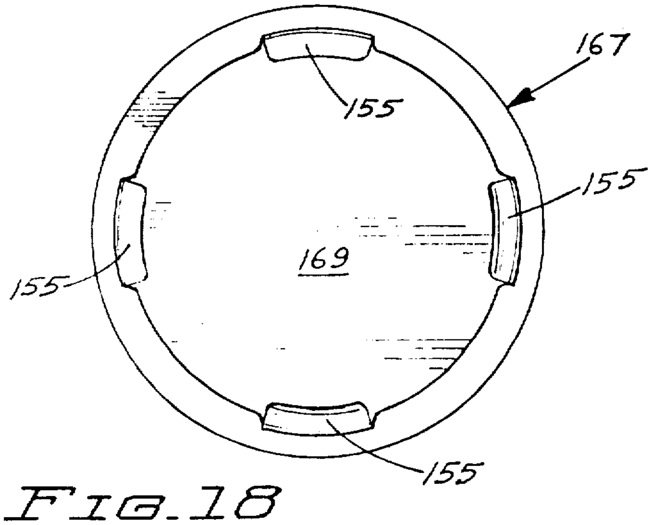
FIG. 18 is an end view of the horn of FIG. 17 taken along the line 18—18 thereof.

The method of closing a container contemplated by the present invention is illustrated in FIGS. 17 through 19 and utilizes a technique termined ultrasonic welding such as is described in U.S. Pat. No. 3,563,822 to Fesh and U.S. Pat. No. 3,224,916 to Soloff et al. The method allows use of containers constituted of economic low-grade thermoplastic, such as polyethylene and polypropylene. Prior to the method described herein, far field ultrasonic welding of such plastics yielded poor results which are believed to result from the poor energy transmission characteristics of such plastics. Application of the present method allows the reliable joining and welding of such materials affording a method of sealably closing containers of the type described herein. The method allows far field welding, or application of ultrasonic energy from a location remote from the intended weld location, at greater distances than is known in the prior art.

It has been found that thermoplastic parts may be reliably and efficiently welded by ultrasonic means at a first location through the application of ultrasonic energy at a second location remote from the first location. The thermoplastic parts are provided with ledges, edges, flanges, or the like, in abuting relationship and intended to be welded together by ultrasonic energy induced at a location remote from the abutting portions. Such a procedure is useful when the intended weld location is inaccessible to an ultrasonic welding horn. The procedure involves the application of ultrasonic energy to both thermoplastic parts. If the parts have portions in adjacent relationship at a second location other than at the location of the intended weld, the ultrasonic energy may be imparted to both parts simultaneously at the second location through a single ultrasonic horn. Preferably at the first location, or the location of the intended weld, one of the parts has a pointed edge in abutting relationship to the other part in order to concentrate ultrasonic energy to produce a weld. Preferably also, one of the parts is securely fixtured proximate the weld location such that the weld location is located between the fixture and the second location or the location of application of ultrasonic energy. So fixturing the part serves also to concentrate the ultrasonic energy. The method is useful in assembling thermoplastic parts such as closing containers of the type having the traditional over-cap and also in closing containers of the type described herein.

Referring to FIG. 17, plug 137 is located in throat 136 of neck 135 of container 127 preparatory to being sealed therein. A suitable fixture, indicated at 165 in FIG. 17, firmly grasps container 127 about neck 135 proximate annular rib 138. The intended weld location is between fixture 165 and the location of application of ultrasonic energy. Container 127 is, for example, located in an assembly line having already been filled with an appropriate liquid or spray product. In lieu of a flat ledge, the inner end of side wall 150 of plug 137 terminates in an inwardly directed annular pointed ledge or edge 166 which functions as an energy director and is in contact with the ledge 151 of the neck 135. A first ultrasonic horn 167 is poised over the plug 137 and outer end 154 of container 127. Horn 167 is assembled in an ultrasonic welding machine having the usual converter and ultrasonic power supply (not shown).

Plug 137 rests in the neck 135 with the outer edges of side wall 150 slightly recessed relative to the outer end 154 of the neck 135. Horn 167 has a flat, circular face 169 adapted to contact the outer edges of plug 137. The end of horn 167 also has four equally spaced horn elements 155 adapted to contact the outer end 154 of neck 135 at four discrete locations thereon at substantially the same time the face 169 contacts the outer edges of the side wall 150 of plug 137. Ultrasonic energy is thus transmitted both to the plug and the bottle neck at the same time. The horn elements 170 also serve to turn over a portion of the outer end 154 of neck 135 to thus form the tabs 156 illustrated in FIG. 15.

According to the method of closing a container, the plug 137 is rested in the neck 135 of container 127 with the sharpened edge 166 of side wall 150 in contact with the outwardly facing ledge 151 of neck 135, as shown in FIG. 17. The energized horn 167 is brought into contact with both the outer end 154 of neck 135 and the outer edge of wall 150 of plug 137 at substantially the same time. The face 169 of horn 167 contacts the outer edge of wall 150 of plug 137 pushing it downward, while the horn elements 170 contact the outer end 154 of neck 135 at four discrete locations thereon. The induced ultrasonic energy causes fusion of the sharpened edge 166 of wall 150 and the outwardly directed ledge 151 of neck 135. In the fusion process, the material of edge 166 softens and flows into the outwardly directed ledge 151 of neck 135, as shown in FIGS. 19 and 14. In the fusion process, there may occur what is known as splash-out wherein a portion of melted material moves away from the joint. The tapered lip 153 extending from the ledge 152 of plug 137 prevents the splash-out from falling into the product contained in the container 127. While transmitting ultrasonic energy to the neck 135, at the same time the horn elements 170 push material from the outer end 154 of neck 135 over the outer edge of the wall 150 of plug 137 to form the tabs 156, as shown in FIGS. 19 and 14, to further secure the plug 137 in place. The method is effective in the sealing of low-grade thermoplastic material such as polyethylene and polypropylene which heretofore could not be reliably welded using far field ultrasonic welding techniques. It is believed that the introduction of ultrasonic energy at the same time to both the plug 137 and the neck 135 produces out of phase ultrasonic vibration in both pieces to increase the efficiency of the ultrasonic welding. The pieces are of sufficiently differing geometry that out of phase vibrations are produced in the respective pieces even though the ultrasonic energy is introduced through a single horn. The weld produced between the ledges 151 and 152 of the bottle neck and plug respectively is substantially continuous along the perimeter of the neck and is reinforced at those locations where the horn elements 170 of horn 167 come in contacting relationship with the outer end 154 of the neck 135.

Figure 20:
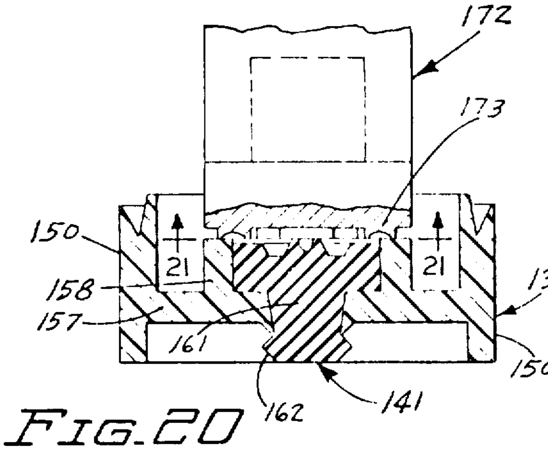
FIG. 20 is a sectional view of a plug for a reservoir illustrating the method of closure thereof according to the present invention.
Figure 22:
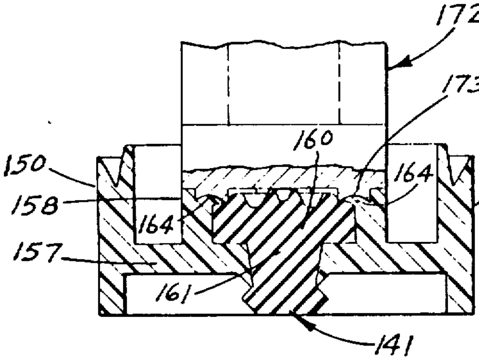
FIG. 22 is a sectional view of a plug for a reservoir further illustrating the method of closure thereof.
Figure 21:
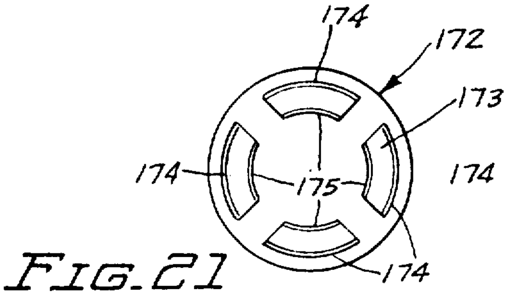
FIG. 21 is an end view of the horn of FIG. 20 taken along the line 21—21 thereof.

The method of securing an elastically penetrable insert in a container plug is illustrated in FIGS. 20 through 22. Elastically penetrable insert 141 is provided in the plug 137 with the base 160 situated in the annular sleeve 158 and the neck 161 extending through the central opening 140 in the wall 157 of plug 137. The head 162 emerges from the opposite side of the central opening 140. As the insert 141 is elastic, the head 162 squeezes through the central opening 140. A second ultrasonic welding horn 172 is poised over the annular sleeve 158 of plug 137 in position to contact the ends thereof. Referring to FIG. 21, the base of horn 172 is provided with a plurality of arcuate horn segments 173 equally spaced about the perimeter thereof. As shown in FIGS. 20 through 22, each horn segment 173 has an exterior prong 174 adapted to contact the end of annular sleeve 158, and an interior prong 175 is adapted to bear against the base 160 of insert 141 when the exterior prong 174 is in contact with the edge of sleeve 158. The interior prongs 175 squeeze the base 160 toward the wall 157 while the exterior prongs 174 move a portion of the material from the edge of sleeve 158 over the base 160 of insert 141, thus to form the flanges 164 securing the base 160 in the annular sleeve 158. Compression of the base 160 by the interior prongs 175 while moving the edge material with the exterior prongs 174 insures that the insert will be snugly and sealably accommodated in the annular sleeve 158 and central opening 140.

The embodiments of the invention in which an exclusive property or privilege is claimed are defined as follows:

1. A method of closing a thermoplastic container of the type having an open neck with an outwardly facing ledge in the neck, said method comprising the steps of:
providing a thermoplastic plug having side wall means closely conforming to the interior wall of the neck;
locating the plug in the neck of the container with a portion of the plug in contact with the ledge of the neck of the container; and
applying ultrasonic energy substantially simultaneously to the neck of the container and the plug at a location remote from the ledge and plug portion to weld together the ledge of the neck and the portion of the plug in contact with the ledge of the neck.

2. The method of claim 1 wherein said plug has an outer peripheral, inwardly facing ledge and wherein the step of locating the plug in the neck of the container comprises: locating the ledge of the plug in mating contact with the ledge of the neck of the container.

3. The method of claim 2 wherein the step of applying ultrasonic energy simultaneously to the neck of the container and the plug comprises: contacting the outer edge of the plug and the outer edge of the neck simultaneously with an ultrasonic welding horn.

4. The method of claim 1 wherein the step of providing a plug includes: providing a plug having an inwardly directed annular pointed edge, and wherein the step of locating the plug in the neck of the container includes locating the plug in the neck of the container with the annular pointed edge of the plug in contact with the ledge of the neck.

5. The method of claim 4 wherein the step of applying ultrasonic energy simultaneously to the neck of the container and the plug comprises: contacting the outer edge of the plug and the outer end of the neck simultaneously with an ultrasonic welding horn.

6. The method of claim 1 including: ultrasonically moving a portion of the outer end of the neck over a portion of the outer edge of the plug.

7. A method of ultrasonically welding together first and second low grade thermoplastic members, comprising the steps of:
locating the first and second members in mating relationship at the intended weld location; and
applying ultrasonic energy to the first member by contact with an energized ultrasonic welding horn at a location remote from the intended weld location, and applying ultrasonic energy substantially simultaneously to the second member by contact with an energized ultrasonic welding horn at a location remote from the intended weld location to weld together the first and second members at the intended weld location.

8. The method of claim 7 wherein the step of applying ultrasonic energy to the first and second members includes: contacting the first and second members substantially simultaneously with a single energized ultrasonic welding horn at a location remote from the intended weld location.

9. A method of ultrasonically welding together first and second thermoplastic members having first edges adapted to be located in mating relationship at an intended weld location, and having second portions in adjacent relationship and remote from the first edges when the first edges are in mating relationship, comprising the steps of:

locating the first and second thermoplastic members with the first edges in mating relationship; and applying ultrasonic energy to the first member by contact with an energized ultrasonic welding horn at the second portion of the first member and applying ultrasonic energy to the second member by contact with an energized ultrasonic welding horn substantially simultaneously at the second portion of the second member to weld together the first and second members at the intended weld location.

10. The method of claim 9 including: fixturing one of the thermoplastic members proximate the intended weld location with the intended weld location between the fixturing location and the second portions, before applying ultrasonic energy.

11. The method of claim 10 wherein: the step of applying ultrasonic energy simultaneously to the first and second thermoplastic members comprises contacting the second portions substantially simultaneously with a single energized ultrasonic horn.

* * * * *